(12) United States Patent
Mischo

(10) Patent No.: US 7,997,027 B1
(45) Date of Patent: Aug. 16, 2011

(54) MODULAR ROOF SYSTEM WITH BORDER SECURED WITHOUT FASTENER

(75) Inventor: Donald J. Mischo, Janesville, WI (US)

(73) Assignee: American Builders & Contractors Supply Co., Inc., Beloit, WI (US)

( * ) Notice: Subject to any disclaimer, the term of this patent is extended or adjusted under 35 U.S.C. 154(b) by 0 days.

(21) Appl. No.: 12/349,529

(22) Filed: Jan. 7, 2009

(51) Int. Cl.
 *A01G 9/02* (2006.01)
(52) U.S. Cl. .................. 47/65.9; 47/65.5; 52/60; 52/561
(58) Field of Classification Search .................. 52/302.1, 52/561, 58–62, 177, 102, 800.11; 47/65.5, 47/65.6, 65.9, 66.1, 67, 85, 86, 33
See application file for complete search history.

(56) References Cited

U.S. PATENT DOCUMENTS

| | | | | |
|---|---|---|---|---|
| 4,706,421 A * | 11/1987 | Thompson | ........................ | 52/94 |
| 4,912,900 A * | 4/1990 | Yeamans | ........................ | 52/273 |
| 5,392,576 A * | 2/1995 | Yeamans | ........................ | 52/408 |
| 5,522,189 A * | 6/1996 | Mortensen et al. | ............. | 52/200 |
| 5,595,021 A * | 1/1997 | Ripley et al. | .................... | 47/66.5 |
| 6,253,487 B1 * | 7/2001 | Yoshida et al. | .................... | 47/33 |
| 6,263,624 B1 * | 7/2001 | Hoy et al. | ........................ | 52/200 |
| 7,603,808 B2 * | 10/2009 | Carpenter et al. | ............. | 47/65.9 |
| 7,726,071 B2 * | 6/2010 | Carpenter | ........................ | 47/65.9 |
| 2002/0166292 A1 * | 11/2002 | Quinn | ........................ | 52/58 |
| 2005/0044791 A1 * | 3/2005 | Morandini et al. | ............. | 47/65.9 |

FOREIGN PATENT DOCUMENTS

WO WO9500729 A1 * 1/1995

* cited by examiner

*Primary Examiner* — Brian Glessner
*Assistant Examiner* — Adriana Figueroa
(74) *Attorney, Agent, or Firm* — Charles S. Sara, Esq.; DeWitt Ross & Stevens, S.C.

(57) ABSTRACT

A roof system includes modular trays placed side-by-side on a roof, and a border along the boundaries of the system. The border includes side members with walls that extend from the roof to the top of the modules, along the length of the outer sides of the modules, to conceal the otherwise exposed sides of the modules. The side members include feet that extend along the roof line, from the base of the sidewalls to below the outer perimeter of the modules such that the weight of the trays holds the feet against the roof. The feet are formed with upward projections that are gravitationally engaged into voids formed in the bottoms of the modules to lock the side members in position at the sides of the modules.

4 Claims, 5 Drawing Sheets

MODULAR ROOF SYSTEM WITH BORDER SECURED WITHOUT FASTENER

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

FIELD OF THE INVENTION

The present invention relates to modular roof systems, and more particularly, to modular roof systems and borders that can be secured together without fasteners.

BACKGROUND OF THE INVENTION

Modular roof systems of the subject type generally include rectangular modular trays that are positioned side-by-side on a roof to hold materials for decorative or functional purposes. The modules may hold, for example, live vegetation such as sedum, herbs, grasses, flowers and other perennials in a growing medium; non-growing materials such as decorative or membrane ballast materials; or both live plants and non-growing materials. Thus, modular roof systems may be used to establish a green roof environment, to provide ballast on roof membranes, and a combination thereof, as well as for other purposes.

Modular roof systems of the subject type are shown and described in detail in, for example, U.S. Pat. Nos. 6,711,851 and 6,862,842; and U.S. patent application Ser. Nos. 09/908,864 and 10/652,836, the disclosures of which are incorporated herein by reference.

When a modular roof system does not cover an entire roof, it may be desirable to establish a cohesive boundary or continuous border along the outer perimeter of the system, as well as along the perimeter of any space that may be surrounded by the system. In such instances, it is desirable to provide a border along the outer and inner otherwise exposed sides of the modules that at such perimeters. When modules of different heights are placed next to each other, it may also be desirable to establish a border along the otherwise exposed portions of the sides of taller modules.

Borders can be used to achieve both aesthetic and functional advantages in modular roof systems. A border can have a decorative or ornamental component, as well as conceal the otherwise exposed module sides and establish an aesthetically desired presentation at the boundaries of the system. A border can connect modules along the boundaries of the system, thereby assisting in maintaining the modules as installed on the roof and consequently maintaining the integrity of the installed system. A border can establish a wall that spans across and closes the space below and above the modules and between adjacent modules at the system boundaries, to inhibit entrance of wind below and between the modules and thereby contribute to enhanced resistance to wind uplift of the system. Those skilled in the art will readily appreciate that borders can be provided in other forms and for additional purposes.

Prior modular roof systems may utilize borders connected to modules with various types of fasteners, which requires both the border and fasteners, as well as the labor to secure the border to the modules with the fasteners.

SUMMARY OF THE INVENTION

The general objective of the invention is to provide new and unique modular roof systems with borders that eliminate the need for separate fasteners, thereby eliminating the cost of the fasteners and the time required to install the fasteners.

Accordingly, an important objective of the invention is to provide a new and unique modular roof system with a border that can be secured to modules at the system boundaries without fasteners.

Another important objective of the invention is to provide a new and unique border that can be secured at the boundaries of modular roof systems without fasteners.

These and other objectives and advantages of the invention will become more apparent from the following detailed description when taken in conjunction with the accompanying drawings.

Briefly, a modular roof system, according to the invention, includes modular trays placed side-by-side on a roof to hold materials for decorative or functional purposes, and an edge system or border along the boundaries of the modular roof system. The border includes side members with walls that extend from the roof to the top of the modules, along the length of the outer sides of the modules, to conceal the otherwise exposed sides of the modules. The side members include feet that extend along the roof line, from the base of the sidewalls to below the outer perimeter of the modules such that the weight of the trays holds the feet against the roof. The feet are formed with upward projections that are gravitationally engaged by the bottom of the trays to maintain the side members in place around the modules. The upward projections are received into voids formed in the bottoms of the trays to lock the border in position.

With this arrangement, the invention assists in maintaining the position of installed modules, and thus the integrity of an installed modular roof system, by connecting together the outer and inner boundary modules without fasteners. The invention also achieves an enhanced resistance to wind uplift by spanning across and closing spaces below and between modules at the system boundaries to inhibit the entrance of wind into such spaces, and being held firmly against the roof or roof by the full weight of the modules at the boundaries of the system.

Figure 1:
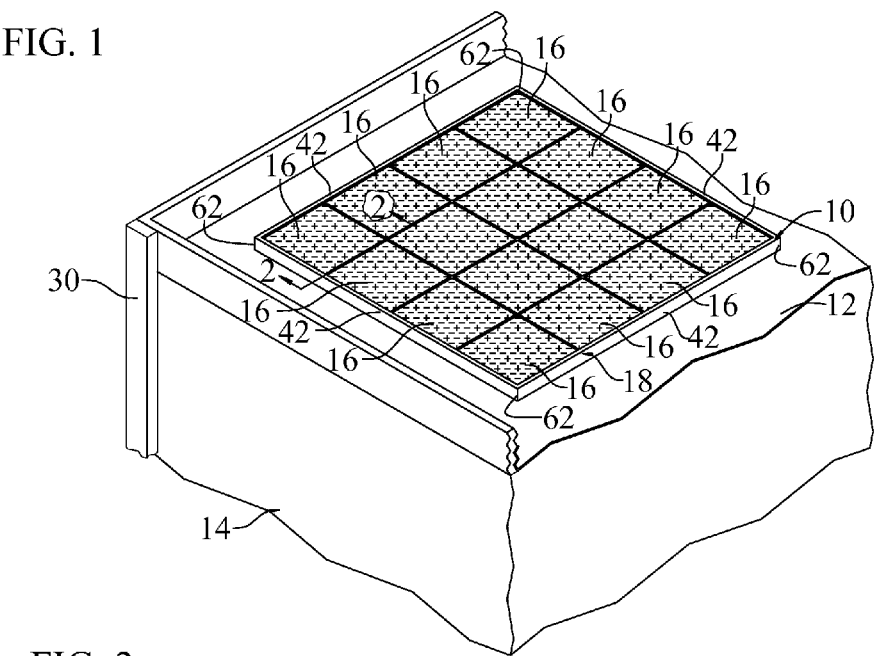
FIG. 1 is a perspective view of a modular roof system incorporating certain aspects of the invention.

While the invention is susceptible of various modifications and alternative constructions, certain embodiments are shown in the drawings and described in detail below. It should be understood, however, that there is no intention to limit the invention to the specific forms and methods disclosed, but on the contrary, the intention is to cover all modifications, alternative constructions and methods, and equivalents falling within the spirit and scope of the invention.

DETAILED DESCRIPTION OF THE INVENTION

Referring now to FIG. 1, one embodiment of the present invention is shown in connection with modular roof system 10 installed on the roof membrane 12 that covers the roof of building 14.

The modular roof system 10 includes modules 16 and an edge system or border 18 at the outer boundaries of the installed modules. The modules are placed side-by-side on the roof, in contact with adjacent modules, or in contact with elements such as spacers or boards running between the modules, to cover a portion of the roof. The border is installed along the outer sides of the outer modules, surrounding the installed modules, and thus establishing the outer perimeter or boundary of the modular roof system.

Figure 2:
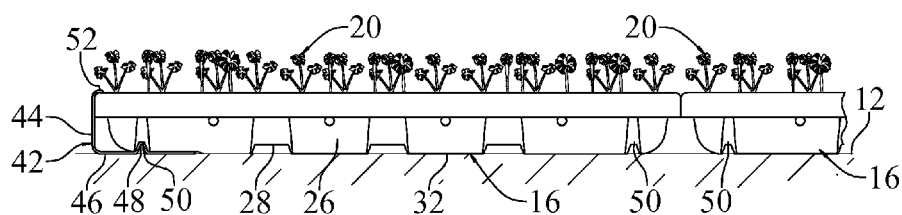
FIG. 2 is side view taken substantially along the line 2-2 of FIG. 1, showing roof modules and a first embodiment border secured thereto.
Figure 3A:
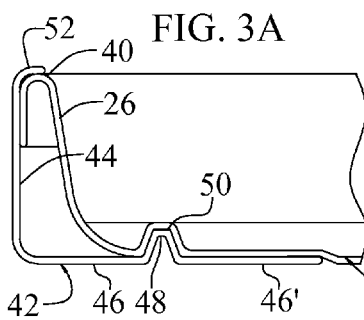
FIG. 3A is a further enlarged fragmentary view of the roof module and border shown in FIG. 3.
Figure 3:
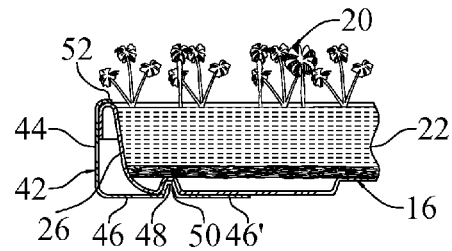
FIG. 3 is an enlarged fragmentary view of a roof module and the border shown in FIG. 2, the side of the module being broken away for viewing the contents in the module.
Figure 3B:
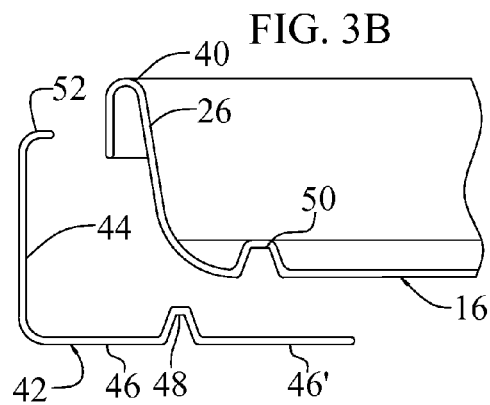
FIG. 3B is an exploded fragmentary view of the roof module and border shown in FIG. 3A.
Figure 4A:
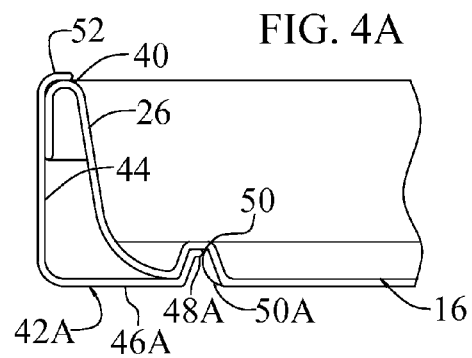
FIG. 4A is a further enlarged fragmentary view of the roof module and border shown in FIG. 4.
Figure 4:
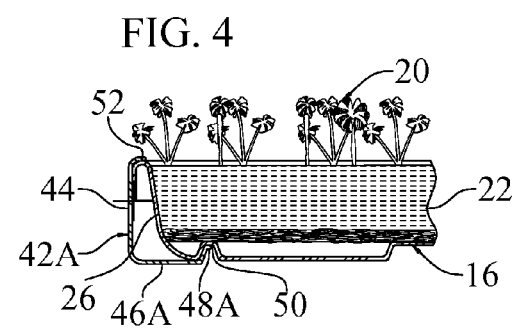
FIG. 4 is a view similar to FIG. 3, but showing a second embodiment border.
Figure 4B:
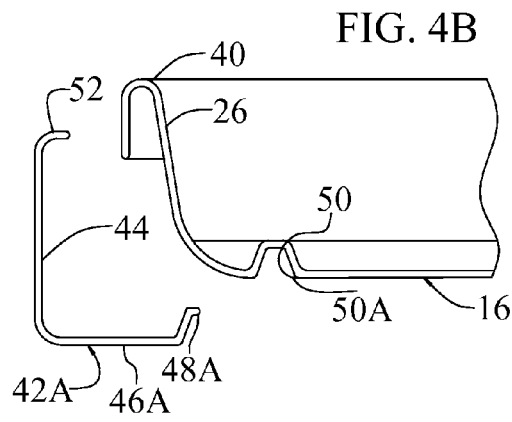
FIG. 4B is an exploded fragmentary view of the roof module and border shown in FIG. 4A.

The modules 16 may hold, for example, live plants 20 (FIGS. 2, 3 and 4) supported in a growing medium 22 (FIGS. 3 and 4) for greenery on the roof and to establish a modular green roof. The modules may hold rocks 24 (FIG. 5) or other ballast materials to establish a modular ballast system with a desired weight distribution for securing the roof membrane in place on the roof. The modules may support both live vegetation and membrane ballast, as well as other decorative or functional fills or structure for other desired purposes such as to establish framework support for photovoltaic panels or other structure above the modules.

The modules 16 are rectangular modular trays or containers with open tops, surrounding sides, and a bottom that permits guided water flow under the module, along the roof membrane to a drainage facility such as down-spout 30. The modules may have drain holes applicable for the purpose of the modular roof system and the materials carried in the modules to achieve desired water retention and drainage characteristics.

Figure 8:
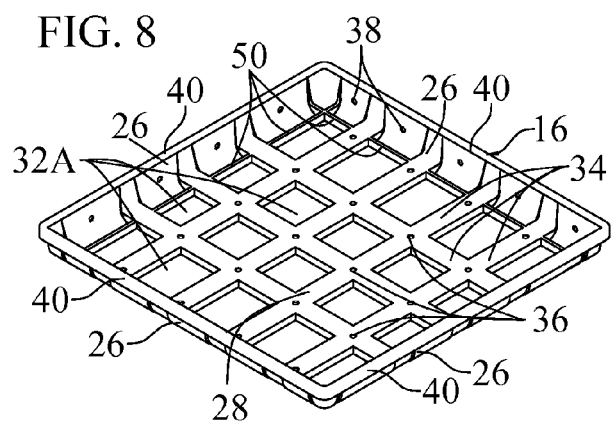
FIG. 8 is a top perspective view of an empty module of a type suitable for use in a modular roof system according to the invention.
Figure 9:
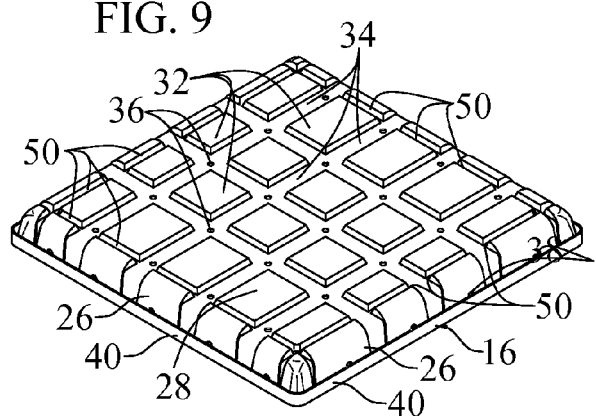
FIG. 9 is a bottom perspective view of the module shown in FIG. 8.

One embodiment molded plastic tray module 16 is shown in detail in FIGS. 8-9. In this instance, the bottom 28 of the tray is formed with feet 32 that raise floor segments 34 above the roof and cooperatively establish channels that permit water drainage under the modules. The feet shown are hollow and open from above to establish water retention pockets 32A in the bottom of the module. Drain holes 36 may be provided in the floor segments for drainage of excess water at a height above the water retention pockets. Overflow drain holes 38 may be provided in the sides 26 of the modules to prevent complete flooding of the modules in the event of heavy rainfall that exceeds the drainage capacity of the holes 36 in the bottom of the modules. In the embodiment shown, flanges 40 extend outwardly from the sides of the modules for grabbing, lifting and moving the modules. The invention may be practiced with alternate configuration modules.

The border 18 is secured to outer modules 16 along the entire lengths of the boundaries of the modular roof system 10 without the need for fasteners. This is accomplished with the border being secured with a gravity interlock and cooperative interaction at the sides of the modules. The edge system 18 includes one or more side members 42 (FIGS. 2, 3, 3A, 3B and 6A) secured in position along each length of the boundary of the modular roof system. The side members are elongated (see e.g., FIG. 6A) to extend along the otherwise exposed edges of several adjacent outer modules. The side members are preferably extruded plastic or plastic-composite, or they may be, for example, a molded plastic or plastic-composite or a sheet metal form (see e.g., side member 42B shown in FIGS. 5, 5A and 5B, and discussion below). Each side member includes a generally upright wall 44 that extends lengthwise along the side of the modules at the boundary of the modular roof system, and that extends upright from the roof on which the modules are placed to an upper location on the side of the modules such as aligned with flange 40 of the modules. The preferred system is establish a finished boundary by concealing the sides of the modules at the boundary of the modular roof system. The side members also include a foot 46 that extends from the base of the wall 44 along the roof to a location underneath the edges of modules. The free end of the foot terminates at a location in contact between the modules and the roof such that the weight of the modules hold the feet and thus the side members in position.

Figure 6A:
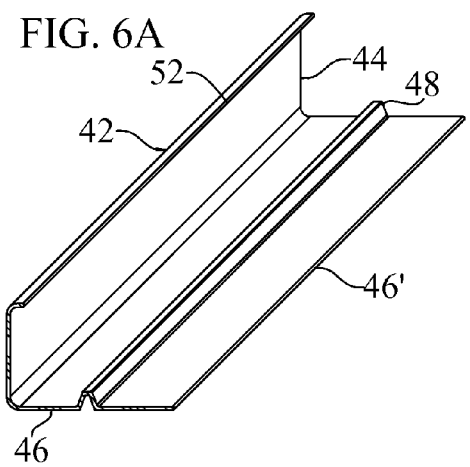
FIG. 6A is a fragmentary inside perspective view of a side member of the border shown in FIGS. 3, 3A and 3B.
Figure 6B:
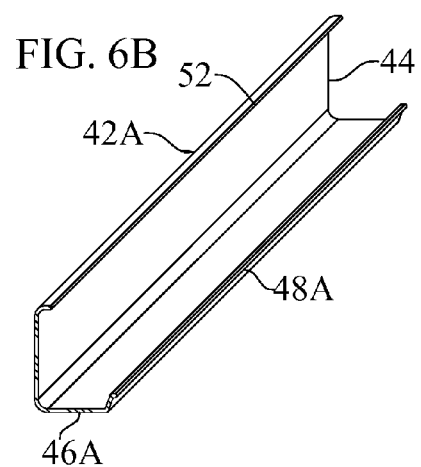
FIG. 6B is a fragmentary inside perspective view of a side member of the border shown in FIGS. 4, 4A and 4B.

The side members 42 further include an upright or upwardly projecting form such as retaining lip 48 that extends from an intermediate position on the foot 46 into gravitational engagement with the bottom of the modules. The lip 48 is snugly received into a void or downwardly opening form such as a slot or groove 50 formed in the bottom of the module spaced inwardly along the outer perimeter thereof. The groove and retaining lip provide positive locking connection between the module and the side members of the edge system, such that the slot prevents the retaining lip, and thus the entire side member, from sliding along the roof deck in a direction away from the module. Referring to FIGS. 8-9, the slots are formed along the bottom of the modules, preferably along all sides so that the modules they may be installed without consideration as to whether a slot will be located at the perimeter of the modular roof system. Advantageously, forming the slots along all sides of a molded plastic module will add essentially zero cost to the module. In the embodiment shown, the foot extends inwardly under the module, to its terminating free end past the slot for enhanced application of the module weight on foot segment 46' and a corresponding increase in holding force applied to the border. The side member shown further includes an upper lip 52 extending from the top of the sidewall to a position above the side of the modules to conceal and snugly engage or embrace the top edges or flanges 40 of the modules. As shown in FIGS. 6A and 6B, all elements of the preferred side member will extend for the entire length thereof. If the side members are molded or otherwise formed, then those skilled in the art will appreciate that the elements of the side member not need to extend for the entire length thereof, but may be formed in multiple spaced segments having a cross-section as shown and described herein.

In a second embodiment shown in FIGS. 4, 4A, 4B and 6B, wherein the same reference numerals are used for the same elements described and shown in side member 42, side member 42A has a foot 46A with a free end that terminates at the top of retaining lip 48A. This embodiment reduces the material required to fabricate the border and may promote easier installation at the sides of certain installed and filled modules. The free end of the retaining lip may be slidably received into the slot 50 of the modules. The slot and free end of the retaining lip may be formed with a cooperative clip or hook arrangement, such as utilizing strip 50A formed integrally in the side of the slot, to achieve an interference or snap-together fit for additional locking security prior to filling the modules and for lightly filled modules.

Figure 5A:
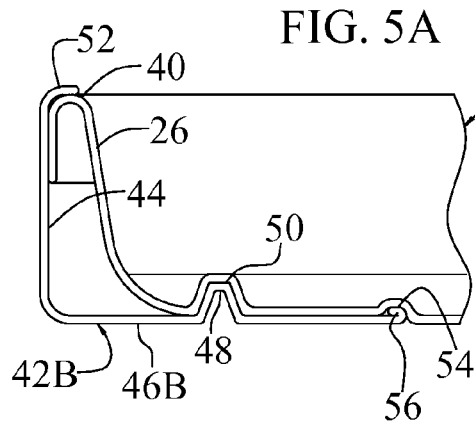
FIG. 5A is a further enlarged fragmentary view of the roof module and border shown in FIG. 5.
Figure 5:
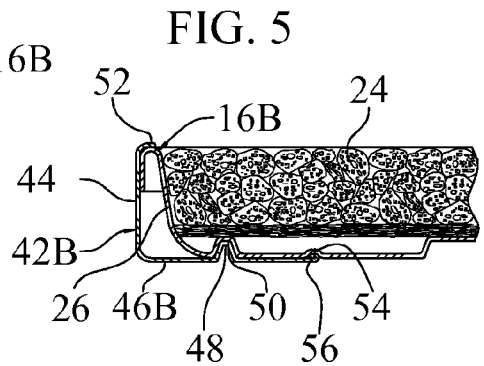
FIG. 5 is a view similar to FIG. 3, but showing a third embodiment border and alternate contents in the module.
Figure 5B:
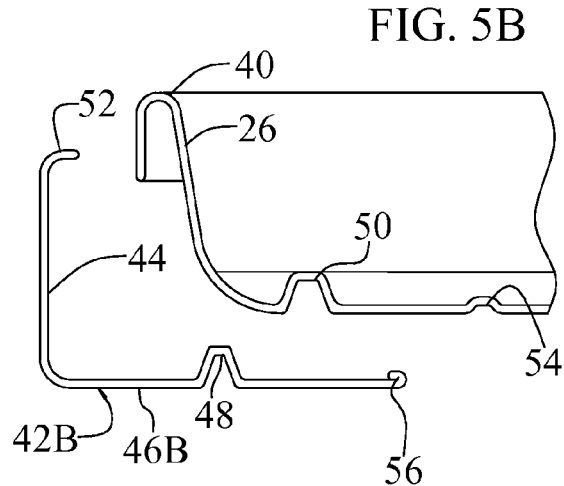
FIG. 5B is an exploded fragmentary view of the roof module and border shown in FIG. 5A.

In a third embodiment shown in FIGS. 5, 5A and 5B, wherein the same reference numerals are used for the same elements described and shown in side member 42, side member 42B has a foot 46B formed with a terminating free end 54 that is smoothly rounded, such as in the form of a smooth bead shown, and optionally turned up and back towards the side wall 44 as can be seen best in FIGS. 5A AND 5B. In this instance, module 16B may include a void such as groove 56 to receive the bead or the weight of the filled module may cause the floor of the module to deform to receive the bead. A smooth bead or similar consideration may be specified in order to reduce the likelihood of abrasion with the roof, which will be of particular importance when there is possibility of a sharp edge at the free end of the foot such as if the side member is sheet metal and the system is installed on a roof membrane. Advantageously, the bead may provide additional positive locking between the side members and the modules, to prevent sliding of the side members away from the modules.

Figure 7:
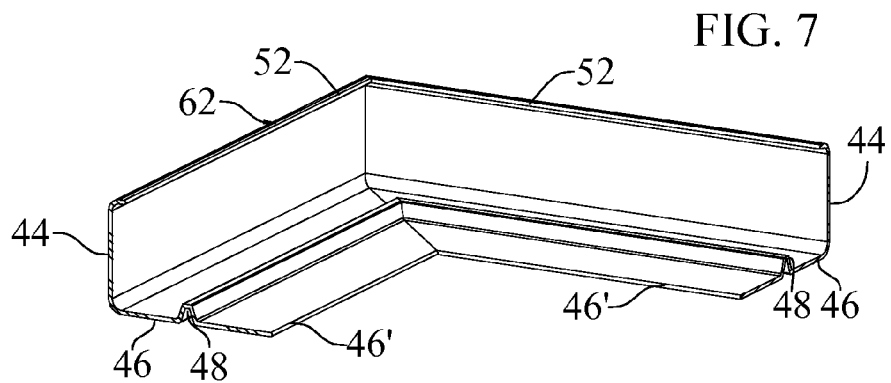
FIG. 7 is a fragmentary inside perspective view of a corner member of the border shown in FIGS. 3, 3A and 3*b*.

The corners of the edge system 18, at the corners of the modular roof system 10, may be established with preformed corner members 62 such as illustrated in FIG. 7, such as with elements similar to those described in the side members 42, 42A and 42B, or by mating the ends of side members together in a convenient manner, such as cutting the feet and lip at a mating angle, and bonding or otherwise securing the ends in the corner together. In either arrangement, the corners of the border prevent the side members from sliding along the sides of the modules. As a result, the border is positively constrained from movement in all directions without the need to fasten the border to the modules once the entire border is installed. It is noted, however, that where use of a corner member is precluded due to the absence of an otherwise exposed corner in the modular roof system, the side members at the ends of the border may need to be fastened to the modules to prevent sliding of the border along the perimeter of the roof system.

Figure 10:
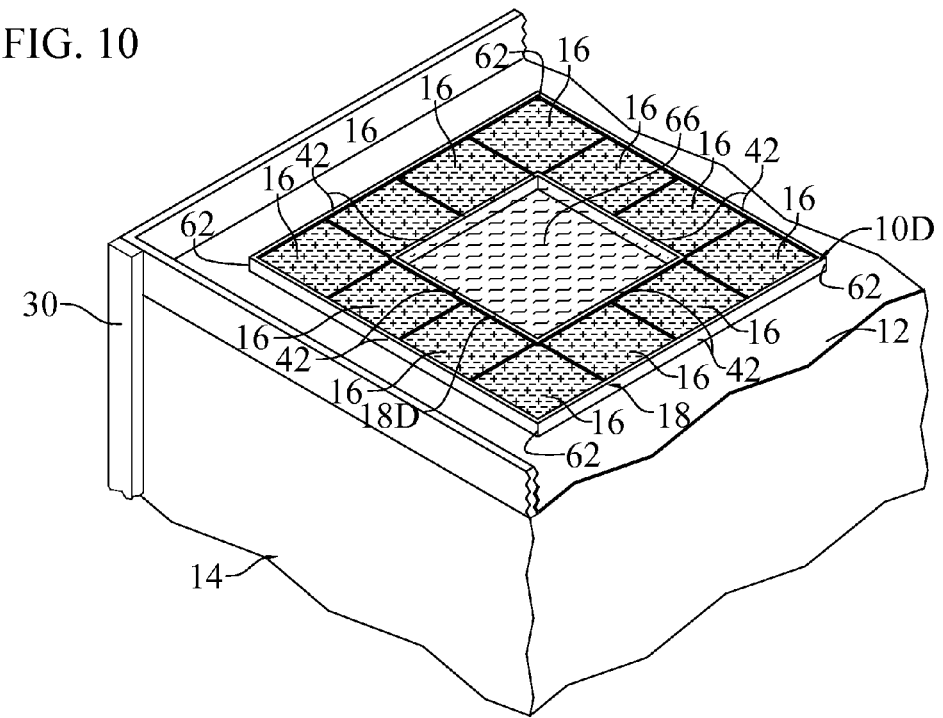
FIG. 10 is a perspective view of an alternate modular roof system incorporating certain aspects of the invention.

As illustrated in FIG. 10, an edge system or border 18D similar to border 18 described above, comprising side members such as 42, 42A or 42B, and optionally inside corner members (similar in construction to outside corner members 62) may be installed on an inside boundary surrounding a non-modular space 66, such at the water pond shown, established within the modular roof system 10D.

Figure 11:
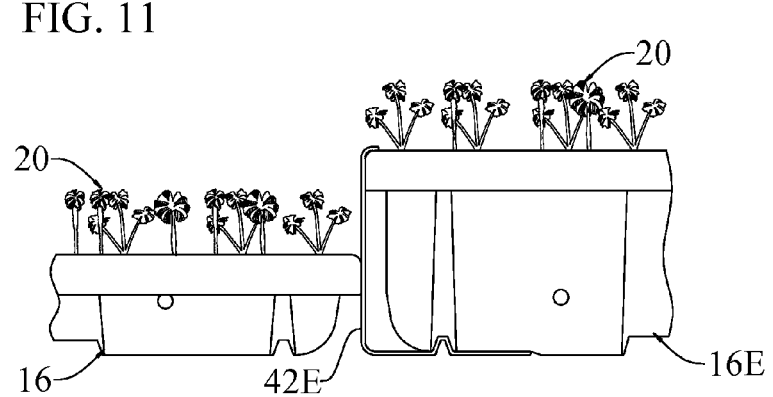
FIG. 11 is a fragmentary side view of fourth embodiment border secured between adjacent roof modules of different heights.

As illustrated in FIG. 11, side member 42E with elements similar to those described above for side members such as 42, 42A, 42B, may be installed between modules 16, 16E of different heights to conceal the edges of the taller module 16E.

From the foregoing, it will be apparent that the present invention brings to the art a new and unique modular roof system and border secured in position along otherwise exposed sides of the modules by cooperative gravity-enabled interlocking without the need to use separate fastener elements. The border is quickly and easily secured in position to the outer modules to achieve a time saving as compared with connecting modules with fasteners; the border conceals the otherwise exposed sides of the modules; and the border may be provided with a decorative element. In addition, the invention achieves connection between adjacent modules to assist in maintaining the integrity of the installed system; and the invention provides enhanced resistance to wind uplift because the border closes the space for the wind to enter under, above and between the modules, and the border is held firmly against the roof membrane by the full weight of the filled modules to achieve a securely locked position at the perimeter of the system.

The invention claimed is:

1. A modular roof system including:
   a. a module having a module first side, a module second side, a module third side, and a module fourth side,
      i. the module first, second, third, and fourth sides extending upwardly from a module bottom to define an enclosure for green roof materials,
      ii. the module bottom having a downwardly opening void; and
   b. a border having:
      i. a side member extending lengthwise along the module first side and upwardly from the roof, the side member extending at least partially up to the top of the module first side;
      ii. a foot extending from the lower end of the side member to underneath the module, the foot including a first foot segment and a second foot segment, the first and second foot segments being on opposing sides of a retaining lip, wherein:
         (1) the retainine lip extends upwardly from the foot and into the void to cooperatively engage the module; and
         (2) the second foot segment extends from the retaining lip to a return bend to form a rounded foot free end.

2. The system of claim 1 wherein the border further includes a side member lip extending from a side member top end in the same direction as the foot extending from a side member bottom end, the side member lip being configured to engage the module first side to secure the border to the module.

3. The systems of claim 1 wherein:
   a. the void extends at least substantially the length of the module first side; and
   b. the second foot segment extends beyond the retaining lip and farther underneath the module bottom.

4. The system of claim 1 wherein
   the module bottom further includes a downwardly opening groove configured to complementarily receive the rounded foot free end.

* * * * *